United States Patent Office 3,450,475
Patented June 17, 1969

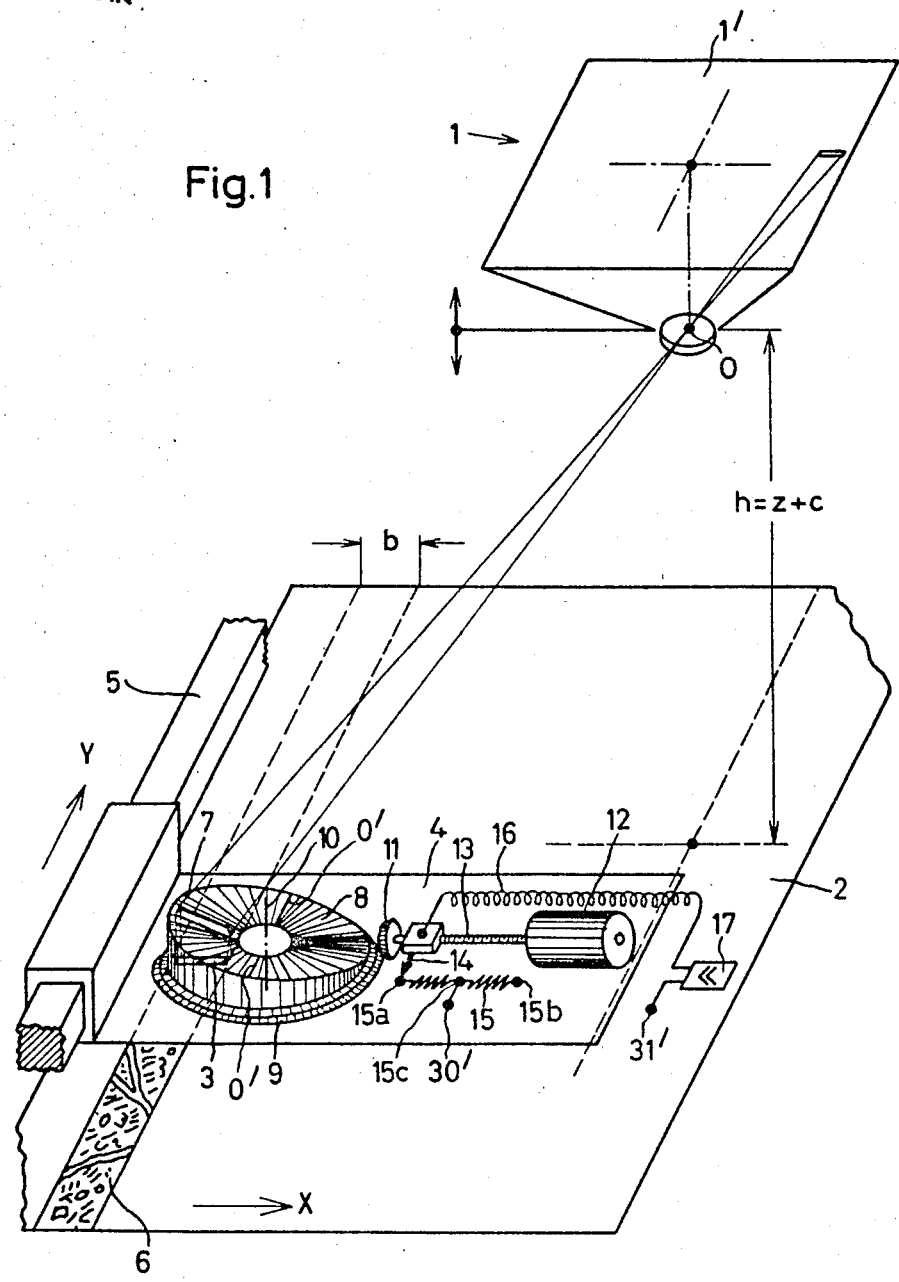

Fig. 2c
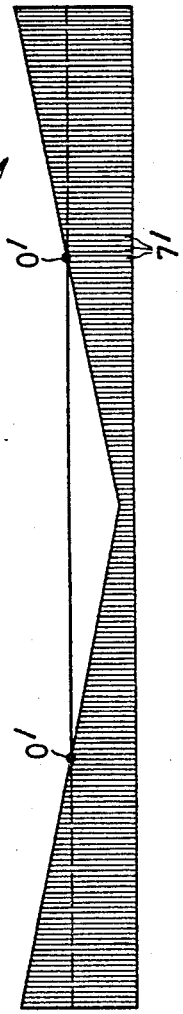
Fig. 2d
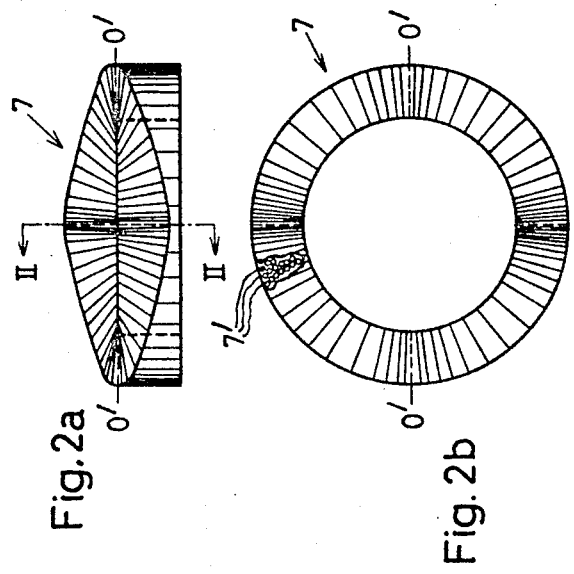
Fig. 2a
Fig. 2b

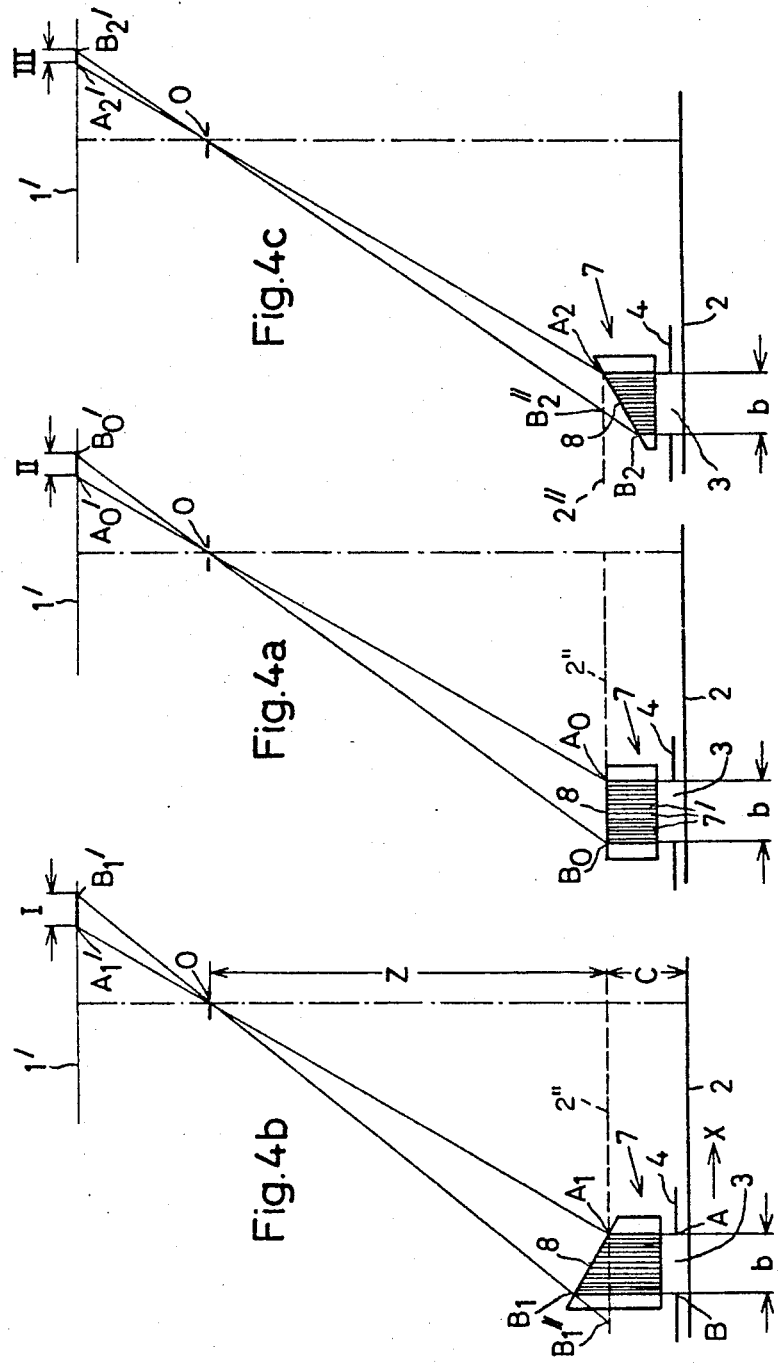

3,450,475
APPARATUS FOR PRODUCING DIFFERENTIALLY RECTIFIED ORTHOGONAL PICTURE PLAN OF SPATIAL OBJECTS
Herbert Mondon, Oberkochen, Wurttemberg, Germany, assignor to Carl Zeiss-Stiftung, doing business as Carl Zeiss, Heidenheim (Brenz), Wurttemberg, Germany, a corporation of Germany
Filed Aug. 3, 1966, Ser. No. 570,009
Claims priority, application Germany, Aug. 13, 1965, Z 11,705
Int. Cl. G03b 27/68
U.S. Cl. 355—52                          3 Claims

ABSTRACT OF THE DISCLOSURE

A method and device for producing a differentially rectified picture plan of three-dimensional objects in which a ring-shaped rectification element rotatable about a vertical axis and composed of vertically positioned light-conducting fibers is arranged above a horizontally movable diaphragm slot of an ortho-projector, whereby the receiving surface of said rectification element facing the projector contains all inclination to be rectified of said three-dimensional object.

---

The invention relates to an arrangement for the production of a differentially rectified orthogonal picture plan of spatial or three-dimensional objects through the projection of central perspective photographs of the objects and undertaken by means of a moving diaphragm slot of strip-like exposeure of photographic layers during continuous change of the picture scale adapted to the height profile of the objective.

In the known methods and arrangements of this type (compare for this purpose, for example, the German Patent No. 1,184,626) for the purpose of the so-called differential rectification, the picture scale of an ortho-projector is controlled according to the height profile measured in a stereo-evaluation instrument. This procedure may take place both with a direct coupling of both instruments as well as by means of a profile storage, whereby the plotting and sensing or scanning of the profile may take place in any desired manner, for example, mechanically, optically, photoelectrically or also electromagnetically.

The disadvantage of these known methods is that the strip-like exposed ortho-photoplan indeed in the longitudinal direction of the strip is rectified differentially, in the transverse components, however, only stepwise (corresponding to the width of the strip selected out of economical consideration).

In the conventional ortho-projections upon a flat, horizontal projection surface (ortho-photoplan), there appear double-images in adjacent exposure strips or deficiency of detail between adjacent strips in addition to the known gaps according to the transverse inclination (transverse to the direction of the exposure strip or the direction, respectively, of the profile measurements) of the spatial or three-dimensional objective, for example, of the photographed landscape.

These phenomena of errors may indeed be decreased, as is set forth in detail in the patent mentioned above, by means of the linear interpolation of intermediary profiles, however, as a result the number of the exposure strips is increased in the same degree as well as the running time of the projector during the exposure of the ortho-photoplan.

The object of the present invention is to develop a device which insures that gaps, double images and deficiencies in detail are overcome to a fargoing extent, while simultaneously permitting the production of optimum adjacent accuracy and accuracy of position of the picture points in both coordinate directions (in direction of the exposure strips and transverse thereto) of the picture plan without a substantial increase in the running time of the projector and in the scanning times (increase in the number of the height profiles to be measured).

This object of the invention is attained that during the projection of the picture strips which are limited by the two previously indicated height profiles, an optical element effecting an affinitive rectification is moved over the moving diaphragm slot in dependency on the particular height difference of the profile.

A preferred arrangement for carrying out this method of the invention by way of example employs a rectification element composed of light-conducting fibers associated with the moving slot of an ortho-projector, the receiving surface of said rectification element facing the projector containing all inclinations or sloping portions to be rectified, respectively, of the three-dimensional object, and whose fibers extend at least to the base surface facing the ortho-photoplan perpendicularly to the ortho-photoplan.

By means of a control device containing an electric tracking device, this rectification element is adjusted in such manner that the particularly indicated profile height difference, which corresponds to the inclination or pitch, respectively, of its receiving surface comes to lie perpendicularly to the running slot.

The invention is now explained more in detail with reference to the accompanying drawings, in which FIG. 1 illustrates diagrammatically only those portions of a known ortho-projection device which are essential in connection with the invention;

FIG. 2a illustrates a side elevation view of the fibre optical ring;

FIG. 2b is a top elevation view of the fibre optical ring;

FIG. 2c is a vertical sectional view of the fibre optical ring along the line II—II of FIG. 2a;

FIG. 2d illustrates the unwound outer wall of the fibre optical ring;

FIGS. 4a, 4b and 4c illustrate each a different step in the employment of the method and device of the invention.

Figure 3:
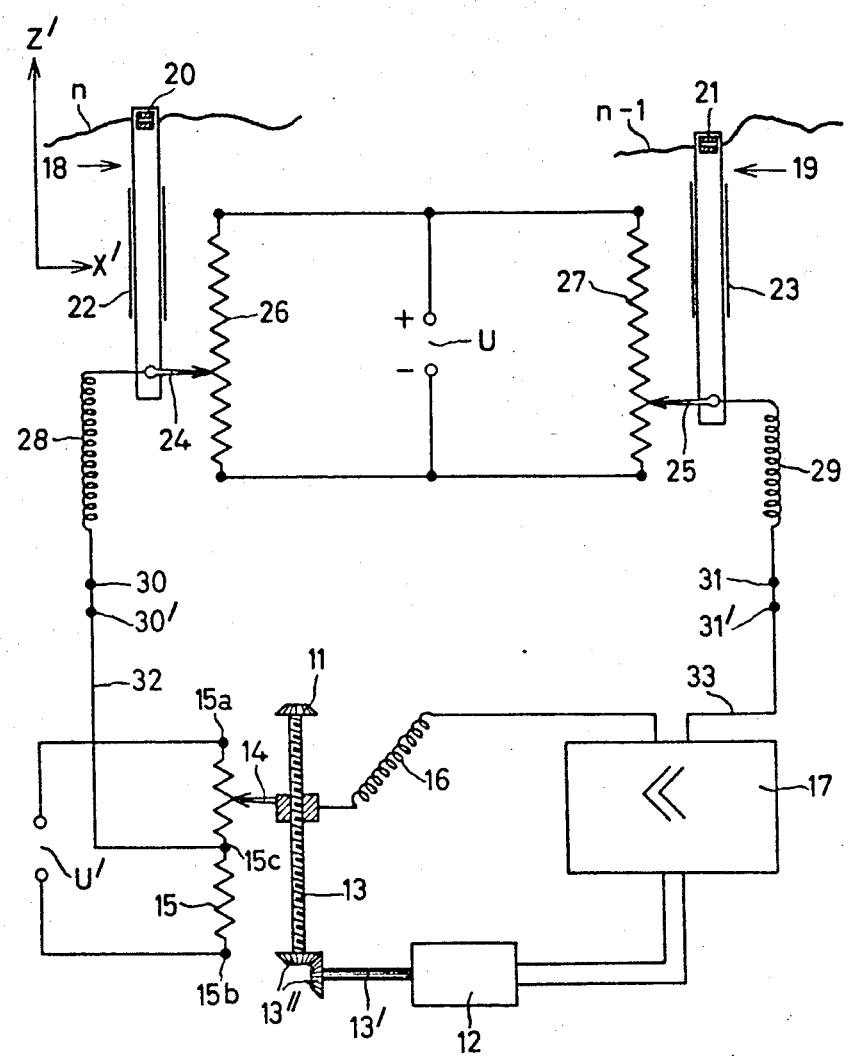
FIG. 3 illustrates diagrammatically one embodiment of a control device cooperating with the fibre optical ring.

The projector with the projection center 0 is indicated by the reference character 1. The reference character 2 indicates the associated projection plane receiving the ortho-photoplan. Directly above the ortho-photoplan is movably arranged the diaphragm carriage 4 with the slot diaphragm 3. The carriage 4 is slidably mounted on a guide rail 5 and moves parallel to the plane 2 in direction $y$, which corresponds to the longitudinal direction of the exposure strips 6. The other guide for adjusting the slot diaphragm 3 a distance equal to the width $b$ of the strip 6 in the $x$-direction at the end or the beginning of each strip exposure has been omitted. The relative distance $h=z$ plus $c$ of the projection center 0 from the projection plane 2 is adjustable by means of a known control device not shown and is controlled by the momentary value of the height profiles measured for the particular exposure strips, for example, of the height profile $n$ pertaining to the right-hand edge of the exposure strip 6 by the ortho-projectors in conventional manner. $z$ is in this connection a size proportional to the momentary value of the height profile and $c$ is a constant to be explained still more in detail.

According to the invention a ring 7 composed of light-conducting fibres is disposed above the exposure slot 3.

The fibres in this ring 7 are oriented perpendicularly to the projection plane 2. The upwardly directed receiving surface 8 of this fibre optical ring facing the projection center 0 is provided in addition to a surface element arranged parallel to the projection surface 2 and containing the horizontal line 0'—0' also with a number of differently inclined surface elements, which correspond to the inclinations or sloping portions, respectively, of the three-dimensional objects to be imaged, for example, of an uneven landscape. The size $c$ is thereby the fixed distance of the horizontal line 0'—0' of the receiving surface 8 of the fibre optical ring 7 from the projection plane 2. Several of the light-conducting fibres are shown in an excessively enlarged scale and are designated with 7'.

Referring again to FIG. 1, the fibre optical ring 7 is mounted in a rotatable annular rack or turntable 9 and both these parts together are rotatable about their common vertical axis 10. The annular rack 9 is driven by a bevel gear 11 fixed to a threaded spindle 13 and the servo-motor 12. The threaded spindle 13 carries an interiorly threaded sensing contact 14 which upon a rotation of the spindle 13 moves over a potentiometer 15. A conductor 16 connects the sensing head 14 with a difference amplifier 17. The parts 12, 14, 15, 16 and 17 are parts of a specific embodiment of a control device for the adjustment of the fibre optical ring 7.

This control device which is diagrammatically illustrated in FIG. 3 contains by way of example two sensing heads 18, 19, scanning for example the stored profiles, such as a profile $n$ and $a$ preceding profile $n-1$ whose divided photoreceivers 20, 21 of said sensing heads scan the profile lines in known manner. The sensing heads 18, 19 are guided by means of the guideways 22, 23 perpendicularly to the profile base line $x'$ (see for this purpose the above cited patent). The sensing heads 18, 19 are connected with slidable contacts 24, 25, which take-off from the potentiometers 26, 27 the voltages $u_1$ and $u_2$ corresponding to the momentarily scanned profile heights $z_1'$ and $z_2'$ and apply these voltages by means of the conductors 28, 29 to the outputs 30, 31 of the transmitter part. The supply voltage for the potentiometers 26 and 27 is designated with the reference character U.

The voltage $u_1$ corresponding to the momentary height value $z_1'$ on the profile $n$ is applied by the control inlet 30' and the supply line 32 to the center tap 15c of the potentiometer 15. The potentiometer 15 or the supply voltage U' applied thereto are so dimensioned that the voltage differences corresponding to the maximum positive or negative, respectively, profile height difference may be obtained. The voltage $u_2$ applied to the control inlet 31' and corresponding to the momentary height value $z_2'$ on the profile $n-1$ is applied by the line 33 to one input of the difference amplifier 17. The line 16 applies the comparison voltage $u_V$ tapped by means of the slidable contact 14 from the potentiometer 15 to the second input of the amplifier 17. As long as a difference in voltage exists between the voltages applied to the difference amplifier 17, the amplified difference voltage operates the servo-motor 12 in accordance with the size and direction of the difference voltage in the one or the other direction until the driven shaft 13' and the gearing 13" and the shaft 13 has moved the slidable contact 14 on the potentiometer 15 to produce a voltage $u_V$ which is equal to the voltage $u_2$ corresponding to the profile height $z_2'$. The positioning of the slidable contact 14 with respect to the center tap 15c of the potentiometer 15 corresponds then to the difference of the two voltages $\Delta u = u_2 - u_1$ obtained by the sensing of the profile, and accordingly also the momentary profile height difference $\Delta z' = z_1' - z_2'$. When both profiles have the same height $z_1' = z_2'$, then the senser 14 would be stationed at the point 15c of the potentiometer 15.

The fibre optical ring 7 shown in FIG. 1 is to be adjusted so that in the last-mentioned condition the horizontal line 0'—0' of the receiving surface 8 comes to lie lengthwise above the exposure slot 3 ($x$-direction). Since the rotation of the fibre optical ring 7 and the position senser 14 are coupled with each other by the threaded spindle 13, the driven bevel gear 11 and annular toothed rack 9, a suitable orientation of the fibre ring in the proper direction of rotation makes it possible that the inclination of the surface 8 of the fibre optical ring 7 corresponding to the scanned profile height difference comes to lie perpendicularly over the exposure slot 3.

The effect of the rectification element according to the invention, which is shown in FIGS. 1 and 2 by way of example as annular fibre optical body 7, may be further explained with reference to the FIGS. 4a, 4b and 4c.

In the diagrammatic illustration of the FIGS. 4a to 4c, again the projection center is designated with 0, and with 1' is indicated the picture plane extending perpendicularly to the plane of the drawing. 2 is the projection plane containing the ortho-photoplan (likewise extending perpendicularly to the plane of the drawing). The exposure slot is indicated with the reference character 3, said exposure slot being guided during the strip exposure perpendicularly to the drawing-plane over the ortho-photoplan. The fibre optical ring 7, shown in section, is indicated in the individual figures in different positions corresponding to different profile inclination. $b$ indicates again the width of the exposure strip which corresponds to the longitudinal direction of the exposure slot 3 in the $x$-direction of the projection plane 2. $z$ is the distance of the projection center 0 from the reference surface 2', dependent on the particular profile height (perpendicularly to the plane of the drawing) and $c$ is the constant remaining distance of the reference surface 2" from the projection surface 2. The distance $z$ is controlled by means of the profile $n$ associated with the right-hand edge A of the exposure slot 3 (extending perpendicularly to the plane of the drawing).

In FIGS. 4a to 4c, it is assumed that the profile height of the profile $n$ in the exposure segments here shown is the same and accordingly the points $A_0$, $A_1$ and $A_2$ lie at the same height, which again means equally long projection distances $z$. The profile $n-1$ associated with the left-hand diaphragm edge B changes, however, and therefore, its profile height is indicated by the points $B_0$, $B_1$ and $B_2$.

In FIG. 4a it is assumed that the profile height of $A_0$ and $B_0$ are the same, and accordingly in the transverse direction of profile $n-1$ to profile $n$, no profile height difference occurs. In this case, the interval $A_0$–$B_0$ is already rectified in the reference plane 2", so that no further rectification is necessary by the element 7, and the latter, therefore, is set to its zero position, that is, the plane surface element of the receiving surface 8 is over the exposure slot 3.

In the exposure segment according to FIG. 4b, the profile height of the point $B_1$ is greater than that of the point $A_1$. A rectification corresponding to the orthogonal projection takes place only then when the associated point of the receiving surface 8 likewise is disposed higher to the same extent. The points $A_1$ and $B_2$ are then fully rectified. For the points lying therebetween, one attains now a fargoing rectification in this way that one approaches the transverse profile extending between $A_1$ and $B_1$ by means of a uniform (linear) increase of the receiving surface 8 and projects the enclosed picture or image through the light fibres 7' directed perpendicularly to the projection plane 2 onto the ortho-photoplan. In the exposure segment shown in FIG. 4c, the profile height of the point $B_2$ is lower than that of the point $A_2$, which is indicated by a corresponding inclination of the receiving surface 8 of the fibre optical ring 7. By the differential optical interpolation of the transverse profile carried out in this way, the explicit detection of intermediary profiles is dispensed with, as it is still necessary by way of example in the above-mentioned patent, and a continuous exposure takes place over the entire width of the strip under simultaneous consideration of all interpolated intermediary profiles. The rectification of the entire photoplan takes place in the lengthwise direction of the strip ($y$-direction) in known manner with the aid of the measured profiles and in the direction transverse to the strip ($x$-direction) simultaneously by means of the controlled adjustment corresponding to the profile height difference of the rectification element according to the invention.

The apparatus according to the invention is in no manner restricted to the embodiments shown by way of example in the figures of the drawing. Thus for example, the rectification element may also consist of an elongated fibrous body or also of a stepped prism made of ordinary glass material, important is only, that this body contain all inclinations to be rectified and may be brought selectively according to the particular profile height difference over the exposure slot. Likewise, the control device indicated by way of example may be varied without departing from the above set forth basic scope of the invention.

What I claim is:

1. A device for producing a differentially rectified picture plan of three-dimensional objects, including a rectification element arranged on a horizontally movable carriage of an ortho-projector, said carriage being movable over a projection plane receiving the ortho-photoplan and being provided below said rectification element with a diaphragm slot, means for slidably supporting and guiding said carriage in a horizontal direction transverse to the longitudinal direction of said slot, said rectification element being formed of an elongated fibrous body containing all inclinations to be rectified and adapted to be moved selectively according to the particular profile height difference over the exposure slot, said fibrous body being composed of light-conducting fibers extending at least at the base surface facing the photographic layer (ortho-photoplan) perpendicularly to said ortho-photoplan.

2. A device for producing a differentially rectified picture plan of three-dimensional objects, including a rectification element arranged on a horizontally movable carriage of an ortho-projector, said carriage being movable over a projection plane receiving the ortho-photoplan and being provided below said rectification element with a diaphragm slot, means for slidably supporting and guiding said carriage in a horizontal direction transverse to the longitudinal direction of said slot, said rectification element being formed of a ring rotatable about a vertical axis and so arranged on the carriage that said slot extends radially of said ring, said ring being composed of light-conducting fibers and the upper receiving surface of said ring facing the projector containing all inclinations to be rectified of said three-dimensional object, said fibers extending at least at the base surface facing the photographic layer (ortho-photoplan) perpendicularly to said ortho-photoplan.

3. A device according to claim 2, including a control device containing an electric servo-motor, and means operated by said motor for rotatably adjusting said rectification element about its vertical axis in such manner that the inclination of its receiving surface corresponding to the particular indicated profile height difference comes to lie vertically over said movable diaphragm slot.

References Cited

UNITED STATES PATENTS

| | | | |
|---|---|---|---|
| 3,277,780 | 10/1966 | Hartwig | 88—24 |
| 3,299,774 | 1/1967 | Schoeler et al. | 88—24 |

NORTON ANSHER, *Primary Examiner.*

R. A. WINTERCORN, *Assistant Examiner.*

U.S. Cl. X.R.

355—9, 31, 47, 50